US009195525B2

(12) United States Patent
Ewe et al.

(10) Patent No.: US 9,195,525 B2
(45) Date of Patent: Nov. 24, 2015

(54) METHOD AND APPARATUS FOR GENERATING A WEB-BASED USER INTERFACE

(75) Inventors: Thomas Ewe, San Francisco, CA (US); Takahiro Okumura, San Francisco, CA (US)

(73) Assignee: SYNACTIVE, INC., Foster City, CA (US)

( * ) Notice: Subject to any disclaimer, the term of this patent is extended or adjusted under 35 U.S.C. 154(b) by 1039 days.

(21) Appl. No.: 12/288,460

(22) Filed: Oct. 21, 2008

(65) Prior Publication Data

US 2010/0100823 A1   Apr. 22, 2010

(51) Int. Cl.
G06F 9/54   (2006.01)
G06F 9/44   (2006.01)
G06F 17/30   (2006.01)

(52) U.S. Cl.
CPC ...... *G06F 9/543* (2013.01); *G06F 8/38* (2013.01); *G06F 17/30893* (2013.01)

(58) Field of Classification Search
CPC .............. G06F 17/30899; G06F 17/22; G06F 17/3089; G06F 17/30893
USPC ........................................................ 715/234
See application file for complete search history.

(56) References Cited

U.S. PATENT DOCUMENTS

| 6,058,375 | A | 5/2000 | Park et al. |
| 6,108,309 | A | 8/2000 | Cohoe et al. |
| 6,397,220 | B1 * | 5/2002 | Deisinger et al. ............ 707/607 |
| 6,760,745 | B1 * | 7/2004 | Tan et al. ....................... 709/203 |
| 6,822,663 | B2 | 11/2004 | Wang et al. |
| 6,970,823 | B1 | 11/2005 | Yago et al. |
| 6,993,712 | B2 * | 1/2006 | Ramachandran et al. ..... 715/234 |
| 7,093,195 | B2 | 8/2006 | Lynch et al. |
| 7,137,127 | B2 | 11/2006 | Slotznick |
| 7,278,110 | B1 * | 10/2007 | Wugofski ...................... 715/765 |
| 7,386,485 | B1 | 6/2008 | Mussman et al. |
| 7,493,591 | B2 | 2/2009 | Charisius et al. |
| 7,577,601 | B1 | 8/2009 | Rademacher et al. |
| 7,752,299 | B2 | 7/2010 | Bookman et al. |
| 7,792,784 | B2 | 9/2010 | Gupta |
| 7,805,523 | B2 * | 9/2010 | Mitchell et al. ............... 709/228 |
| 7,809,600 | B1 | 10/2010 | Como et al. |
| 7,899,763 | B2 | 3/2011 | Machulsky et al. |
| 7,970,943 | B2 * | 6/2011 | Lin et al. ....................... 709/246 |
| 8,010,605 | B2 | 8/2011 | Chang |

(Continued)

FOREIGN PATENT DOCUMENTS

WO    2008/031625 A2    3/2008

OTHER PUBLICATIONS

International Search Report and Written Opinion mailed May 3, 2010 for PCT Application No. PCT/US2009/061469.

(Continued)

*Primary Examiner* — Alvin Tan
(74) *Attorney, Agent, or Firm* — Procopio Cory Hargreaves and Savitch LLP; Patrick J. Rawlins

(57) ABSTRACT

A method and apparatus for generating a user interface comprising generating an interface information packet comprising user interface information readable by a script-based application, sending the interface information packet to a client device, and generating a user interface of the client device via a display engine in accordance with the interface information packet.

13 Claims, 4 Drawing Sheets

(56) References Cited

U.S. PATENT DOCUMENTS

| | | |
|---|---|---|
| 8,166,130 B2 | 4/2012 | Reinart |
| 2002/0083154 A1 | 6/2002 | Auffray et al. |
| 2003/0014496 A1 | 1/2003 | Spencer et al. |
| 2003/0231750 A1 | 12/2003 | Janveja et al. |
| 2006/0041618 A1 | 2/2006 | Chang |
| 2006/0212846 A1 | 9/2006 | O'Farrell et al. |
| 2006/0265662 A1 | 11/2006 | Gertzen |
| 2007/0094597 A1* | 4/2007 | Rostom .......... 715/700 |
| 2007/0112958 A1* | 5/2007 | Kim .......... 709/224 |
| 2007/0124670 A1 | 5/2007 | Finck et al. |
| 2007/0150820 A1* | 6/2007 | Salvo .......... 715/760 |
| 2007/0220527 A1 | 9/2007 | Tolgu et al. |
| 2007/0234235 A1 | 10/2007 | Scott |
| 2007/0238488 A1 | 10/2007 | Scott |
| 2007/0238489 A1 | 10/2007 | Scott |
| 2007/0256003 A1* | 11/2007 | Wagoner et al. .......... 715/501.1 |
| 2008/0040653 A1 | 2/2008 | Levine |
| 2009/0013267 A1 | 1/2009 | Cudich et al. |
| 2009/0013281 A1* | 1/2009 | Helfman et al. .......... 715/788 |
| 2009/0204583 A1 | 8/2009 | Hechler et al. |
| 2009/0228490 A1* | 9/2009 | Faenger .......... 707/10 |
| 2009/0318126 A1 | 12/2009 | Schimitzek |
| 2010/0005053 A1* | 1/2010 | Estes .......... 707/1 |
| 2010/0100823 A1 | 4/2010 | Ewe et al. |
| 2011/0111742 A1 | 5/2011 | Neil et al. |
| 2011/0307630 A1 | 12/2011 | Lange et al. |
| 2012/0110209 A1 | 5/2012 | Bonefas et al. |
| 2013/0060845 A1 | 3/2013 | Chalana et al. |
| 2013/0097095 A1 | 4/2013 | Rumig et al. |
| 2013/0103391 A1 | 4/2013 | Millmore et al. |

OTHER PUBLICATIONS

GuiXT Designer Configuration Guide, GuiXT® by Synactive, 2009, Synactive, Inc. Foster City, CA, 13 pages.

GuiXT Designer Installation Guide, GuiXT® by Synactive, 2009, Synactive, Inc. Foster City, CA, 17 pages.

* cited by examiner

METHOD AND APPARATUS FOR GENERATING A WEB-BASED USER INTERFACE

BACKGROUND OF THE INVENTION

1. Field of the Invention

The present disclosure generally relates to a network based computer interaction and, more particularly, to generating a web-based user interface for a client device.

2. Description of the Related Art

Computer systems exist that enable a user to remotely access computer information, e.g., a database. In some instances a user will use a client device, e.g., cell phone, personal digital assistant (PDA), lap top computer, application specific device, and the like, to connect via a network to a server hosting the information. Such devices have a predefined interface for accessing the computer information from the server. The interface may be created by a program or agent executing on the device; however, such programs or agents require substantial processing resources and memory availability which make them unsuitable for many devices. The interface, produced by such programs or agents, is static—the user enters data and/or queries in predefined fields.

More recently, to accommodate a wide range of devices, browsers have been used to launch web pages that form the interface to the computer information (i.e., web-based user interface). Although web-based user interfaces generally utilize less computer resources than application (program) based interfaces, the interface remains static, i.e., once created, the interface remains the same for each user. Such a static nature to the interface may impact worker productivity in that the interface cannot be easily optimized to their work habits.

Specifically, web pages are typically static (as predefined in HTML form) or dynamically generated using an application server (as in PHP or ASP form). This arrangement results in either a completely static web page, or a web page that must be rendered by the browser any time an update is made by the application server. Furthermore, anytime an update is made to the page, the application server must resend the entire page. This process is time consuming and may result in a sluggish and time consuming user experience.

Although applications exist which are capable of running interactive web sites, they typically require a large install, significant processing power, and a significant amount of data to be transmitted to and from the application server. These requirements make the applications unsuitable for uses on many types of devices, such as mobile devices. These devices are often limited to static interfaces for these reasons.

It would be advantageous if it were possible to access a web application through a user interface that does not require the installation of a large application or resending an entire web page. Therefore, there is a need in the art for a dynamic web user interface generator.

SUMMARY OF THE INVENTION

An embodiment of the invention comprises a method and apparatus for generating a web-based user interface. The method comprises generating an interface information packet, sending the interface information packet to a client device, and generating a user interface of the client device via a display engine in accordance with the interface information packet. The interface information packet comprises user interface information readable by a script-based application. The display engine comprises the script-based application.

An embodiment of the apparatus comprises a web-based user interface generator and a display engine. The web-based user interface generator generates an interface information packet comprising user interface definition information readable by a script-based application, and sends the information packet to a client device. The display engine, comprising the script-based application, parses the interface information packet and generates a user interface from the data contained therein.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
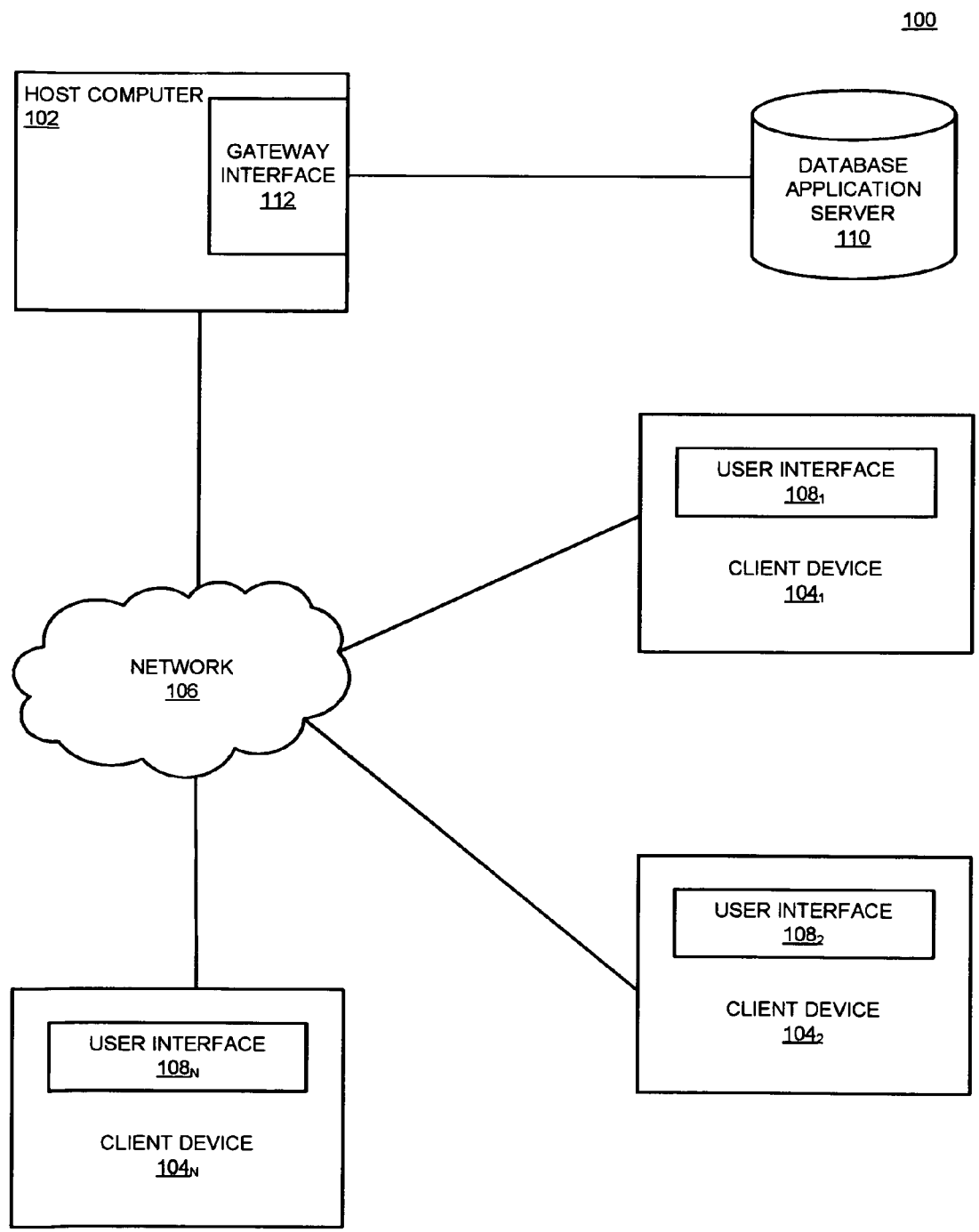
FIG. 1 depicts a block diagram depicting a computer network in which an embodiment of the present invention is used.

FIG. 1 is a block diagram depicting an embodiment of a system 100 for generating a web-based user interface 108 according to an embodiment of the present invention. In one embodiment, the system comprises a host computer 102, one or more client device(s) 104, and a network 106 coupling the host computer 102 and the client device(s) 104. The host computer 102 generates interface information packets sent to the client device 104 to generate the web-based user interface 108. Because the web-based user interface 108 is generated by the host computer, a separate instance of the interface can be stored for each client device 104. The host computer may comprise a host application that communicates with the client device 104, or the host application may be located on another host computer. In one embodiment, the host computer 102 may be coupled to a database application server 110. The host computer 102 may provide a gateway interface 112 to the database application server 110 for the client device(s) 104. This gateway interface 112 allows the client device 104 to interact with the database application server 110 via a web browser environment. In one embodiment, the gateway interface 112 facilitates communication between the client device 104 and the database application server 110 by providing additional data, function calls, wrapper functions, and the like not present in the initial communication from the client device. In one embodiment, the gateway interface 112 parses communications from the database application server 110 into a format readable by the client device 104.

Figure 2:
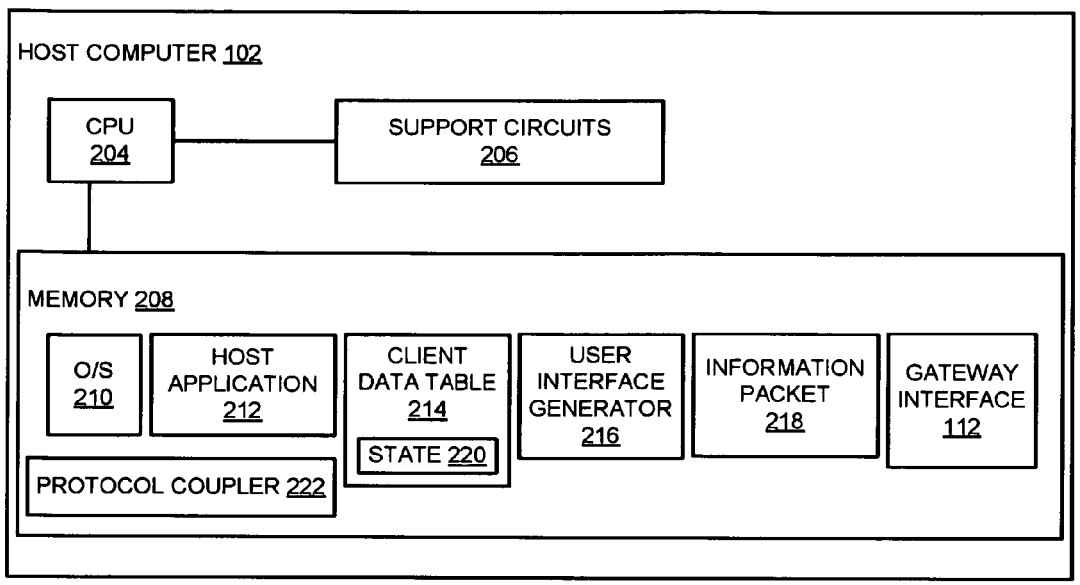
FIG. 2 depicts a block diagram of the host computer of FIG. 1.

FIG. 2 is a block diagram depicting an embodiment 200 of the host computer 102. The host computer 102 is a computing device such as those generally known in the art. The host computer 102 includes a central processing unit (CPU) 204, support circuits 206, and memory 208. The CPU 204 may comprise one or more commercially available microprocessors or microcontrollers that facilitate data processing and storage. The various supporting circuits 206 are utilized to facilitate the operation of the CPU 204 and include such circuits as clock circuits, power supplies, cache, input/output circuits, and the like. The memory 208 may comprise random access memory, read only memory, removable storage, optical disk storage, disk drive storage, and combinations thereof. The memory 208 stores a server operating system 210, a host application 212, a client data table 214, a user interface generator 216, an interface information packet 218, a gateway interface 112, and a protocol coupler 222. In operation, the CPU 204 executes the operating system 210 to control the general utilization and functionality of the host computer 102.

The CPU 204 also executes the host application 212. The host application 212 listens for an incoming request from the network 106. In one embodiment, when the incoming request is received, the host application 212 executes a user interface generator 216 to create an interface information packet 218 comprising interface definition information for the interface of the client device 104. A person of ordinary skill in the art would recognize that in another embodiment of the invention, it is possible to incorporate the user interface generator 216 into the host application. When the user interface generator 216 is executed by the host application 212, it creates an interface information packet 218, as discussed in detail with respect to FIG. 5. The interface information packet 218 comprises interface definition information. The interface information packet 218 is then sent to the client device 104.

In one embodiment, the host computer 102 may further comprise a protocol coupler 222. The protocol coupler 222 provides an interface for the gateway interface 112 to communicate with the user interface generator 216. The protocol coupler 222 translates communications received from a database application server 110 into a format readable by the user interface generator 216. The user interface generator 216 uses these communications to generate interface information packets 218 to generate the user interface 108.

In one embodiment, the host computer 102 may further comprise a client data table 214. The client data table 214 stores one or more client interface states 220. The client data table 214 resides in memory and may comprise a database, a data table, or any other data structure capable of storing client interface information. The client interface states 220 represent a current state of a client device user interface. In this embodiment, the user interface generator 216 queries the client data table 214 for the client interface state 220 comprising a device that sent the incoming network request. The interface information packet 218 is generated in accordance with the client information state 220 corresponding to the client device 104.

Figure 3:
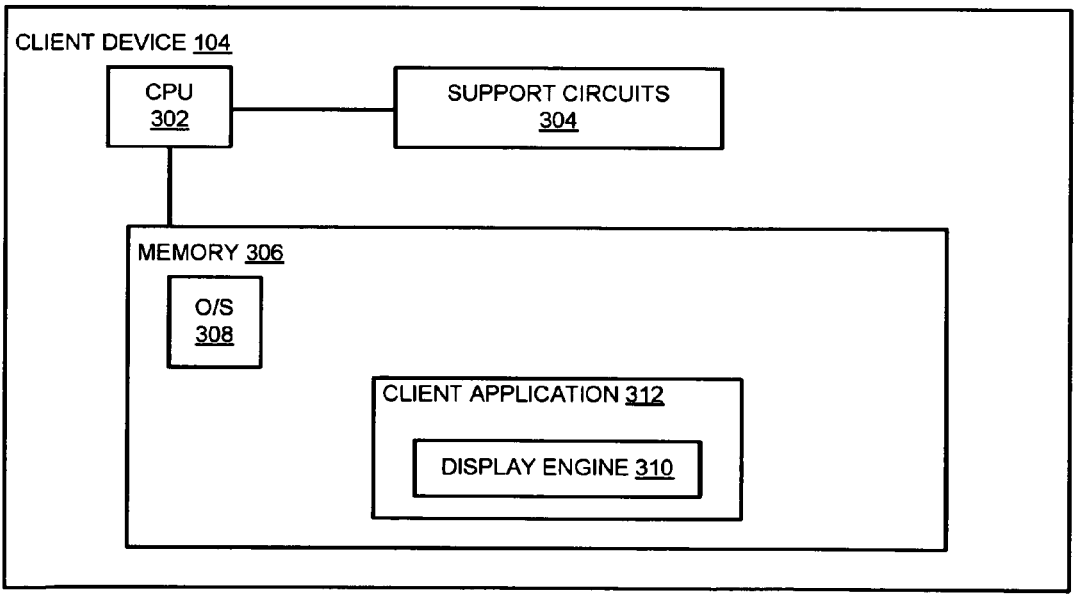
FIG. 3 is a block diagram of the client device of FIG. 1.

FIG. 3 depicts a block diagram of an embodiment 300 of the client device 104. The client device 104 is a computing device such as those generally known in the art. In one embodiment, the client device may comprise one of a handheld bar code reader, a cellular phone, a PDA, a personal computer, or any other wired or wireless computing device that supports a web browser. The client device 104 includes a CPU 302, support circuits 304, and memory 308. The CPU 302 may comprise one or more commercially available microprocessors or microcontrollers that facilitate data processing and storage. The various supporting circuits 304 are utilized to facilitate the operation of the CPU 302 and include such circuits as clock circuits, power supplies, cache, input/output circuits, and the like. The memory 306 may comprise random access memory, read only memory, removable storage, optical disk storage, disk drive storage, and combinations thereof. The memory 306 stores an operating system 308 and a client application 312. In operation, the CPU 302 executes the operating system 308 to control the general utilization and functionality of the client device 106.

The CPU 302 also executes the client application 312. The client application 312 may comprise a web browser or a binary application that executes a web browser module. The client application 312 receives interface information packets 218 from the host application 212 executed by the host computer 102. In one embodiment, the client application 312 may provide an interface to a database application server 110 coupled to the host computer 102. The client application 312 may communicate with a host application 212 executed on the host computer 102, which may in turn communicate with the database application server 110. The host application 212 may modify the communications received from the client application 312 to make said communications suitable for interaction with the database application server 110. Responses to these communications may be received from the database application server 110 by the host application 212, and may in turn be communicated to the client application 312 by the host application 212. In this manner, the client application 312 may communicate with the database application server 110 when such communication would ordinarily not be possible. The client application 312 further comprises a display engine 310. The display engine 310 is executed from within the client application 312 for the purpose of generating the user interface 108. Interface information packets 218 received by the client application 312 are processed by the display engine 310. In one embodiment, the client application 312 is, at least in part, a web browser and the display engine 310 executes within the browser.

The display engine 310 generates the user interface in accordance with the data contained within the interface information packet 218. In one embodiment, the display engine 310 comprises a set of commands provided in a scripted language. Such applications are commonly used in web-based applications because they do not require binary executable code to be sent to the client device 104. One example of such a scripted language is JAVASCRIPT.

The display engine 310 executes in a web browser environment, and accepts interface information packets 218 received via the web without the need for the web browser to render the interface itself. The task of generating the user interface 108 is left to the display engine 310, rather than the browser from which it was launched. In one embodiment, the display engine 310 generates the user interface 108 by modifying the Document Object Model (DOM) of a displayed web page. In this manner it is possible for the display engine 310 to generate a user interface 108 via the intermediate representations provided by the interface information packets 218, rather than resending the entire web page, as would normally be required.

The display engine 310 generates a user interface in accordance with the interface information packets 218 received from the host computer 102. The client application may receive the interface information packet 218 at any time, as they may be used for such purposes as refreshing a user interface screen.

Figure 4:
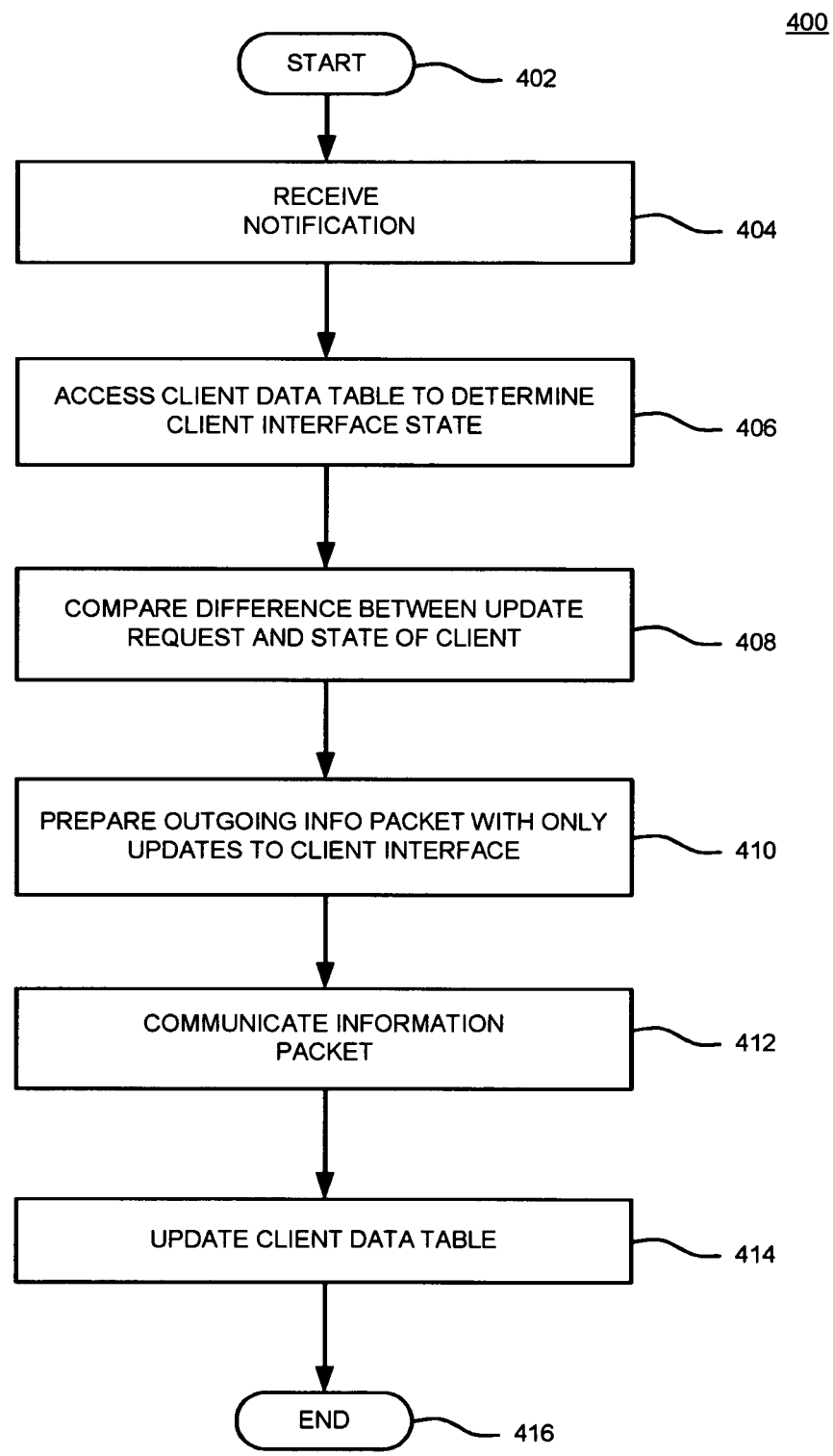
FIG. 4 is a flow diagram of a method of creating an information packet in accordance with an embodiment of the present invention.

FIG. 4 depicts an embodiment of a method 400 for generating an interface information packet. The method begins at step 402. At step 404, the host application 102 executes the user interface generator 216, indicating that an interface information packet 218 should be generated. The notification may be generated for any reason the host application 102 would send an interface information packet 218 for the client user interface, such as a timer indicating the screen must be refreshed, a response to a network request received from the client device 104, a response to a network request received from another client device, and the like. Unlike a normal web page, which requires a request to be sent from the client device 104 to the host computer 102, an interface information packet 218 may be sent to modify the client user interface 108 at any time.

At step 406, the user interface generator 216 accesses the client data table 214. Then, at step 408 the user interface generator 216 then determines the client interface state 220 corresponding to the client device 104 for which the interface information packet 218 is generated. At step 410, the interface information packet 218 is generated comprised of the client information state 220 determined in step 408. At step 412, the interface information packet 218 is communicated to the host application to send the interface information packet 218 to the client device 104. At step 414, the user interface generator 216 saves the client interface state 220 corresponding to the client device 104 in the client data table 214. The method ends at step 416 after the packet has been sent and the client interface state 220 saved.

Figure 5:
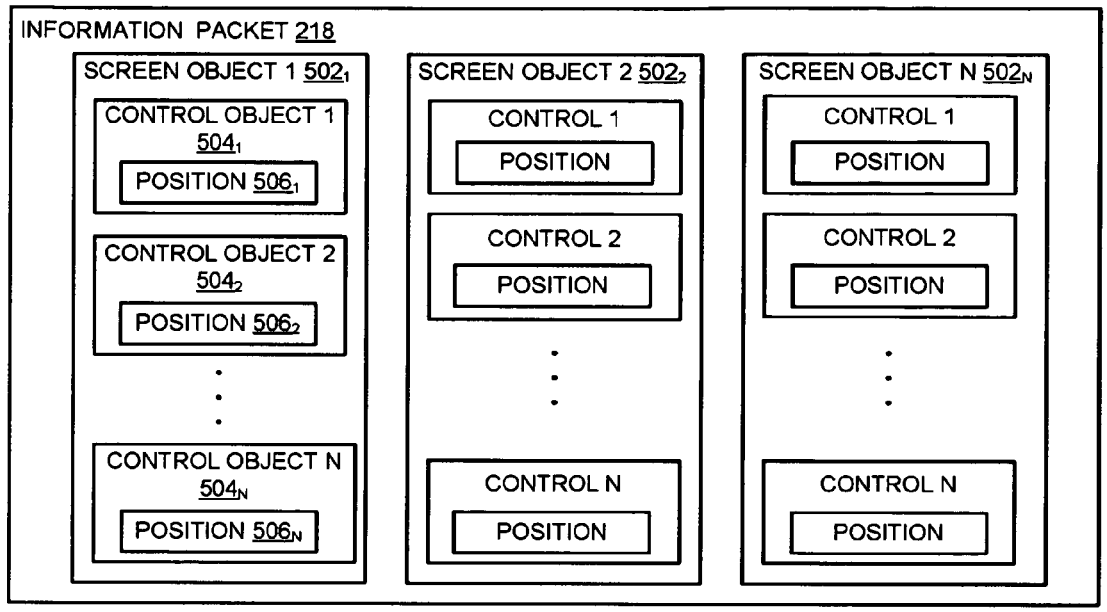
FIG. 5 is a block diagram of an information packet sent to a client device in accordance with an embodiment of the present invention.

FIG. 5 depicts an embodiment of an information packet 218. In one embodiment, the information packet 218 is comprised of one or more user interface definitions. The user interface definitions are comprised of data describing the client user interface. In one embodiment, the user interface definitions may be comprised of one or more of a JAVASCRIPT Object Notation (JSON) data structure. The JSON structure comprises data describing a screen object 502. The screen object 502 corresponds to a particular screen of the client application 312. Each screen object 502 comprises one or more of a control object 504. The control object 504 is comprised of data indicating which user interface control, such as a list box, text entry field, text label, and the like, is modified. Each control object 504 also comprises a position 506, which corresponds to the position of the control object on the screen.

Figure 6:
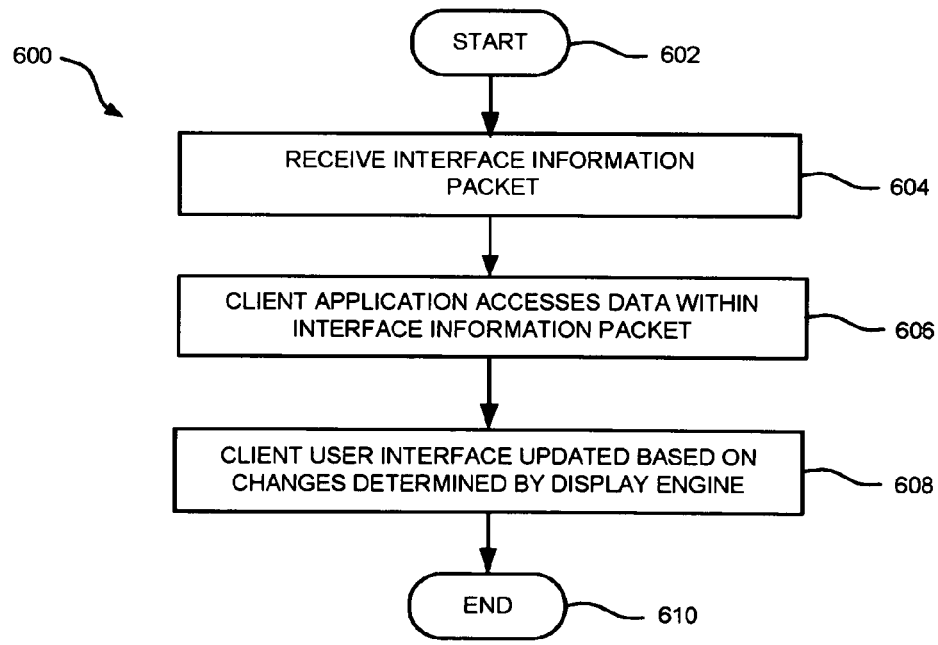
FIG. 6 is a flow diagram of a method of generating a user interface of a client application in response to the receipt of an information packet in accordance with an embodiment of the present invention.

FIG. 6 depicts a block diagram of an embodiment of a method 600 to generate a user interface of a client device 104 upon receipt of an interface information packet 218. The method begins at step 602. At step 604, the client device 104 receives an interface information packet 218. At step 606, the client application 312 accesses the information contained within the interface information packet 218. At step 608, the display engine 310 generates a user interface 108 in accordance with the data accessed from the interface information packet 218. The method ends at step 610 when the data from the interface information packet 218 has been incorporated into the user interface 108.

While the foregoing is directed to embodiments of the present invention, other and further embodiments of the invention may be devised without departing from the basic scope thereof, and the scope thereof is determined by the claims that follow.

The invention claimed is:

1. A method of generating a user interface comprising:
generating a user interface on a client device via a display engine executing within a web browser, where the display engine comprises a script-based application and the user interface is made of one or more screen objects each comprising one or more control objects having user interface controls, the user interface configured to serve as an interface for the client device to interact with a database application server coupled to a host computer;
modifying the user interface through manipulation of the user interface on the client device;
translating, at the host computer, the modification to the user interface as a user interface state into a format readable by the database application server;
receiving one or more communications from the database application server responsive to the translating of the modification;
translating, at the host computer, the one or more communications received from the database application server to a format for execution by the script-based application for the client device, the one or more communications from the database application server corresponding to a screen object of the one or more screen objects;
generating, based on the user interface state and the one or more communications received from the database application server, an interface information packet comprising user interface definition and modification information for use by the script-based application, when a communication is retrieved from the client device;
storing the user interface state in a client data table stored on the host computer;
sending the interface information packet to the client device in response to a user interface refresh signal;
generating, from execution of the script-based application on the interface information packet, a representation of the user interface in accordance with the interface definition and modification information, wherein the user interface is rendered as a webpage;
modifying the generated user interface on the client device by modifying a document object model (DOM) of the webpage associated with the user interface in the web browser in accordance with the representation to change corresponding ones of the one or more screen objects on a display of the webpage;
wherein the user interface definition in the interface information packet is comprised of the screen object, the screen object being of the JavaScript Object Notation (JSON) type and having information describing the position of corresponding control objects on the display.

2. The method of claim 1, further comprising:
repeating the generating of the interface information packet to periodically refresh the user interface.

3. The method of claim 1 wherein the client device comprises a personal computer.

4. The method of claim 1 wherein the client device executes an application configured to execute commands received in the JavaScript programming language.

5. The method of claim 1 further comprising:
receiving a communication from a remote database application; and
generating the interface information packet in accordance with the communication received from the remote database application.

6. The method of claim 5 further comprising:
translating the communication received from the remote database application in a protocol coupler.

7. An apparatus for generating a user interface comprising:
a user interface generator, stored in a memory and executed by a processor, for generating a user interface on a client device comprising a display engine wherein the display engine comprising a script-based application and executes from within a web browser and the user interface is made of one or more screen objects each comprising one or more control objects having user interface controls, the user interface configured to serve as an interface for the client device to interact with a database application server coupled to the apparatus;

modifying the user interface through manipulation of the user interface on the client device;

translating, at a host computer, the modification to the user interface as a user interface state into a format readable by the database application server;

receiving one or more communications from the database application server responsive to the translating of the modification;

translating the one or more communications received from the database application server to a format for execution by a script-based application for the client device, the one or more communications from the database application server corresponding to a screen object of the one or more screen objects;

generating, based on the user interface state and the one or more communications received from the database application server, an interface information packet comprising user interface definition information and modification information readable by the display engine;

storing the user interface state in a client data table stored on the apparatus;

sending the interface information packet to the client device in response to a user interface refresh signal;

generating, from execution of the script-based application on the interface information packet, a representation of the user interface in accordance with the interface definition and modification information, wherein the user interface is rendered as a webpage;

modifying the generated user interface on the client device by modifying a document object model (DOM) of the webpage associated with the user interface in the web browser in accordance with the representation to change corresponding ones of the one or more screen objects on a display of the webpage;

wherein the user interface definition in the interface information packet is comprised of the screen object, the screen object being of the JavaScript Object Notation (JSON) type and having information describing the position of corresponding control objects on the display.

8. The apparatus of claim 7 further comprising:
a remote database application for sending a communication to the user interface generator wherein the information packet is generated in accordance with the sent communication.

9. The apparatus of claim 8, further comprising:
a protocol coupler for translating the sent communication from the remote database application into a format readable by the user interface generator.

10. The apparatus of claim 7 wherein the client device executes an application configured to execute commands received in the JavaScript programming language.

11. The apparatus of claim 7 wherein the client device comprises a personal computer.

12. The apparatus of claim 7 wherein the client device communicates with the user interface generator via a wireless signal.

13. An apparatus for generating a user interface comprising:
a database application server;
a host computer coupled to the database application server comprising a user interface generator which:
translates, at the host computer, a modification to the user interface made by a client device as a user interface state into a format readable by the database application server;
translates one or more communications received from the database application server that was sent in response to the translating of the modification, to a format for execution by a script-based application for the client device, the one or more communications from the database application server corresponding to a screen object of one or more screen objects on the user interface that comprise one or more control objects having user interface controls;
generates, based on the user interface state and the one or more communications received from the database application server, an interface information packet, the interface information packet comprising user interface definition and modification information for use by a script-based application, when a communication is retrieved from the client device;
stores the user interface state in a client data table on the host computer; and
sends the interface information packet to the client device in response to a user interface refresh signal; and
the client device coupled to the host computer comprising a display engine which:
receives the interface information packet for modifying the user interface through manipulation of the user interface on the client device;
generates, from execution of the script-based application on the interface information packet, a representation of the user interface in accordance with the interface definition and modification information, wherein the user interface is rendered as a webpage; and
modifies the generated user interface by modifying a document object model (DOM) of the webpage associated with the user interface in a web browser of the client device in accordance with the representation to change corresponding ones of the one or more screen objects on a display of the webpage;
wherein the user interface definition in the interface information packet is comprised of the screen object, the screen object being of the Javascript Object Notation (JSON) type and having information describing the position of corresponding control objects on the display.

* * * * *